March 23, 1971    M. E. HEBERT    3,572,148
V-BELT
Filed June 10, 1969    2 Sheets-Sheet 1
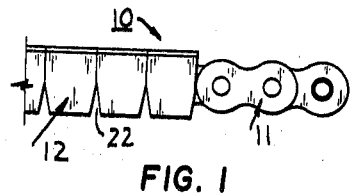
FIG. 1
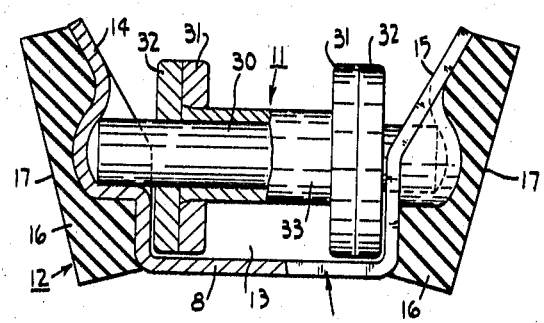
FIG. 2
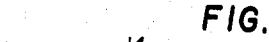
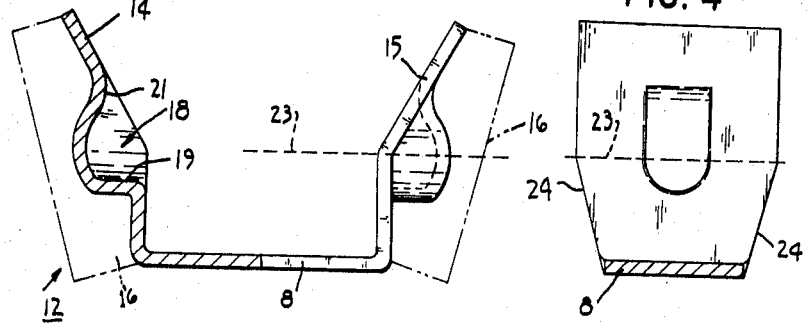
FIG. 3    FIG. 4
INVENTOR
MAURICE E. HEBERT
BY: CUSHMAN, DARBY +
CUSHMAN
ATTORNEYS March 23, 1971   M. E. HEBERT   3,572,148
V-BELT Filed June 10, 1969   2 Sheets-Sheet 2

INVENTOR
MAURICE E. HEBERT
BY: CUSHMAN, DARBY +
CUSHMAN
ATTORNEYS

United States Patent Office 3,572,148
Patented Mar. 23, 1971

3,572,148
V-BELT
Maurice E. Hebert, 2069 Chapdelaine,
Ste-Foy, Quebec, Canada
Filed June 10, 1969, Ser. No. 831,855
Claims priority, application Canada, May 2, 1969,
50,382
Int. Cl. F16g 5/18
U.S. Cl. 74—236                                         10 Claims

ABSTRACT OF THE DISCLOSURE

A V-belt comprising a metallic chain having inner and outer links interlocked by a plurality of pivot pins, each of the pins extending beyond the sides of the chain to removably secure between its opposed ends in an associated friction member having outer friction surfaces.

---

This invention relates to V-belts and more particularly to an improved metallic chain V-belt.

The majority of V-belts known for use in transmitting drives are generally of the non-metallic type and these are normally trained about a pair of pulleys. These types of non-metallic V-belts have certain disadvantages in that they are of limited load carrying capacity and accordingly will slip about their associated pulleys when the drive is increased or decreased abruptly thereby suddenly increasing the weight of the load on the belt. Further, since the majority of these belts are constructed entirely or partly of rubber, these will have a certain degree of elasticity and will stretch during usage, thus frequently requiring adjustment of the tension of the belt. Also, when breakage occurs an entirely new belt is required as repair thereof would not be practical.

It is an object of the present invention to provide a metallic chain V-belt which substantially overcomes any of the above-mentioned disadvantages.

Accordingly, from one broad aspect the present invention relates to a V-belt comprising a plurality of inner and outer pairs of chain links interconnected by a plurality of pivot pins to form an endless chain, a plurality of friction members having a base and two opposed upstanding end portions provided with an outer friction surface, each said pivot pins being removably secured at its ends between the inner surfaces of said end portions of an associated friction member, said links and friction members being held together by said pins for flexible movement in a plane perpendicular to the longitudinal axis of said pins the ends of each said pivot pins being removably secured between a pair of co-axially aligned recesses provided in the inner surface of a respective end portion of said associated friction member to provide a substantially constant pressure against said opposed end portions.

The invention is illustrated, by way of example, in the accompanying drawings in which:

FIG. 1 is a side view, partly sectioned, of a portion of the chain V-belt of the present invention, FIG. 2 is a front section view, partly fragmented, showing the metallic chain and friction member, FIG. 3 is a front view of the friction member, FIG. 4 is a side view of FIG. 3;

Figure 6:
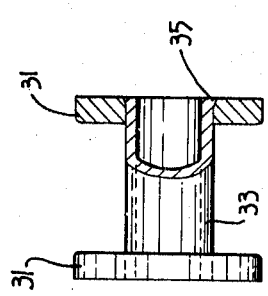
FIG. 6 is a side view, partly fragmented, of FIG. 5.

Referring to the drawings and more specifically to FIG. 1, there is shown, generally at 10, the chain V-belt comprising an endless metallic chain 11 having a plurality of friction members 12 removably secured thereto.

As can be seen from FIGS. 2, 3 and 4, each friction member 12 comprises a steel clamp 9 of generally U-shape cross-section having a base 8 and two upstanding end portions 14 and 15 thereby defining a channel portion 13 therebetween. The end portions 14 and 15 extend perpendicularly upwardly from the base 8 and diverge angularly outwardly from a planar axis 23 to their respective ends. A recess 18 is provided in the interior surface of each upstanding end portion 14 and 15 and are co-axially aligned with each other. Each recess 18 defines a pin supporting surface 19 at the bottom thereof and aligned parallel to the planar axis 23 and the surface of the base 8 to support a connector pin 30 and associated chain links in the channel portion 13. The recess 18 further defines a concave end portion 20 for engagement with the convex end 38 of pivot pin 30, and a bulbous portion 21 facing inwardly toward the channel portion 13 to overlap the ends of the pivot pin 30 located between the recess 18.

From FIG. 4 it can be seen that the side edges 24 of the end portions 14 and 15, taper angularly inwardly from the planar axis 23 to the base 8 to define a substantially V-shape space 22 with the edge of an adjacent end portion when secured to the chain links as shown in FIG. 1. The V-shape space 22 permits flexible movement of the endless chain to provide for arcuate displacement about one or more associated pulleys (not shown). To provide a uniform friction surface in the exterior surface of the end portions 14 and 15, these are provided with a hard rubber shoe 16 rigidly affixed and embedding the recess projection therein. The shoes 16 define a uniform surface 17 disposed angularly for frictional engagement with the inner surface of a V-shaped pulley or sheave (not shown).

Figure 5:
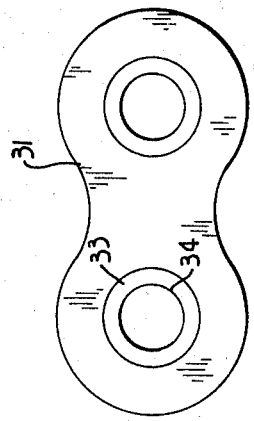
FIG. 5 is a front view of the inner link.

Referring now to FIGS. 2 and 5 to 8, there is shown the detailed construction of the endless metallic chain 11. The chain 11 is constituted by a plurality of interlocking inner and outer chain links 31 and 32, of the standard type. The inner links 31 are secured in pairs, as shown in FIGS. 5 and 6, by means of two cylindrical hollow sleeves 33 which are force fitted about their end peripheries in the circular holes 34 of an associated inner link 31. The edge of the holes 34 adjacent the outer surface of the inner links 31 may contain a slight upward taper 35 and the ends of the sleeve 33 may be expanded slightly, by suitable means, to engage with the tapered portion 35 to prevent the inner links from separating from their associated sleeves 33. Other means, not shown, may be used to secure the inner links about the end peripheries of the sleeves 33.

Figure 8:
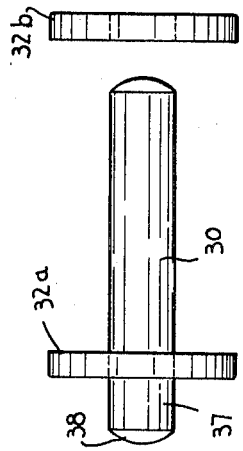
FIG. 8 is a side view of the link of FIG. 7 showing its relationship to a pivot pin.
Figure 7:
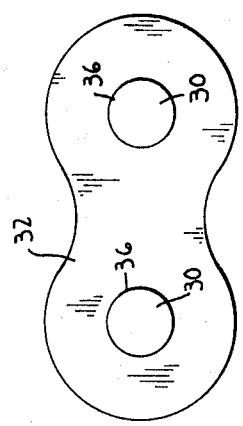
FIG. 7 is a front view of the outer link.

As shown in FIGS. 7 and 8, the outer links 32 are also provided in a pre-arranged manner for interlocking with the inner pairs of links 31. Herein shown, one outer link 32a is force fitted over two pivot pins 30, one in a respective circular hole 36 of the outer link. The outer link 32a is positioned on the pins 30 a limited distance from the end of the pins to provide an extension portion 37 at the opposite ends of each pin 30 when the outer and inner links are placed thereon. With this outer link arrangement it can be seen that by placing the sleeve 33, at the end of adjacent pairs of inner links, over a respective one of the two pins 30 associated with an outer link, two pairs of inner links 31 may be interconnected. The other outer link 32b is provided with holes 36 slightly larger than those of outer link 32a, so that outer link 32b may be placed over the pins 30, when the sleeves of the inner links are position thereon, to thereby complete the interlocking of adjacent pairs of inner links between outer links 32a and 32b.

To secure the inner links 31 and outer links 32a and 32b in place and to lock the assembly, the extension portion 37 at each end of a pin 30 is detachably secured in a respective recess 18 of an associated friction member 12. Further, the ends 38 of each pin 30 define a convex surface to abut rigidly against the concave end portion 20 of the recess 18, and to facilitate removal and engagement of the pins in the recesses. The steel clamp 9 is of sufficiently resilient steel to permit removal of a pin 30 secured therein.

If replacement of any part of the V-belt 10 is required a section or element of the structure can be easily dismantled and replaced. Further, it can be seen from FIG. 2 that both outer links 32 may be in sliding engagement with the pins 30, as both of these outer links would be held in place between the ends of the sleeve 33 of the inner links 31 and a portion of the inner surface of the end portions 14 and 15 of the clamp 9.

With this type of metallic chain V-belt there is provided a substantially constant pressure against the end portions of the friction members thus preventing slipping of the V-belt in its associated pulleys. Further, the construction of the belt is rigid and can easily and inexpensively be repaired.

While only one embodiment of the invention has been shown, it is not intended to be limited thereby, but only by the scope of the appended claims.

I claim:
1. A V-belt comprising a plurality of inner and outer pairs of chain links interconnected by a plurality of pivot pins to form an endless chain, a plurality of friction members having a base and two opposed upstanding end portions provided with an outer friction element, each said pivot pins being removably secured at its ends between the inner surfaces of said opposed end portions of an associated friction member, said links and friction members being held together by said pins for flexible movement in a plane perpendicular to the longitudinal axis of said pins, said ends of each said pivot pins being removably secured between a pair of co-axially aligned recesses provided in the inner surface of a respective end portion of said associated friction member to provide a substantially constant pressure against said opposed end portions.

2. A V-belt as claimed in claim 1 wherein said inner links are secured in pairs and in fixed spaced apart relationship by two cylindrical hollow sleeve secured about their end peripheries to an associated circular hole in said pair of inner links.

3. A V-belt as claimed in claim 1 wherein each said pivot pins are located in a respective hollow sleeve and projects from the ends thereof sufficiently to support an outer link at each end and to secure between a pair of said co-axially aligned recesses provided in the inner surface of said end portions of said friction member.

4. A V-belt as claimed in claim 2 wherein one of said outer links is rigidly secured to a pair of said pivot pins, a fixed distance from one end thereof, to support a said sleeve of adjacent pairs of inner links and the other outer link to provide interlock of said pairs of inner links.

5. A V-belt as claimed in claim 4 wherein each said upstanding end portions extends perpendicularly upwardly from said base to the plane of the central longitudinal axis of said pivot pin when retained therebetween and then diverge angularly outwardly to provide an open side portion for said recesses to facilitate insertion and removal of said pivot pin in said recesses.

6. A V-belt as claimed in claim 1 wherein said friction member is of substantially U-shape cross-section and said end portions taper angularly outwardly in the uppermost portion thereof to facilitate insertion and removal of said pins in said recesses.

7. A V-belt as claimed in claim 1 wherein said end element comprises a rubber shoe secured to the outer surface thereof, each said shoes having a uniform friction surface for frictional engagement in an associated sheave.

8. A V-belt as claimed in claim 7 wherein the end surfaces of said pivot pins are generally convex.

9. A V-belt as claimed in claim 1 wherein each said co-axially aligned recesses define a pin supporting surface disposed parallel to the said base, a concave end portion for engaging an end of an associated pivot pin and a bulbous portion for retaining the end portion of said pin in said recess.

10. A V-belt as claimed in claim 1 wherein the lower portion of the side edges of said upstanding end portions taper angularly inwardly to the base of said friction member to define a substantially V-shape space betwwen the lower edge portions of adjacent end portions of adjacent friction members to provide said flexible movement between said links and said frictional member in a plane perpendicular to the longitudinal axis of said pivot pins.

References Cited

UNITED STATES PATENTS

| | | | |
|---|---|---|---|
| 1,476,603 | 12/1923 | Firminger | 74—236 |
| 2,279,134 | 4/1942 | Dalrymple | 74—236 |
| 2,475,264 | 7/1949 | Sutton | 74—236 |

FOREIGN PATENTS

| | | | |
|---|---|---|---|
| 422,575 | 1/1935 | Great Britain | 74—236 |

MILTON KAUFMAN, Primary Examiner